Aug. 30, 1960 L. V. GUEST 2,950,921
SOUND REPRODUCING APPARATUS
Filed June 17, 1957 8 Sheets-Sheet 1

INVENTOR
Lawrence V. Guest
BY
Ralph B. Stewart
ATTORNEY

Aug. 30, 1960 L. V. GUEST 2,950,921

SOUND REPRODUCING APPARATUS

Filed June 17, 1957 8 Sheets-Sheet 2

INVENTOR
Lawrence V. Guest
BY
Ralph B. Stewart
ATTORNEY

INVENTOR
Lawrence V. Guest
BY Ralph B. Stewart
ATTORNEY

INVENTOR
Lawrence V. Guest
BY
Ralph B. Stewart
ATTORNEY

SOUND REPRODUCING APPARATUS

Filed June 17, 1957 8 Sheets-Sheet 5

INVENTOR
Lawrence V. Guest
BY
Ralph B. Stewart
ATTORNEY

Aug. 30, 1960 L. V. GUEST 2,950,921

SOUND REPRODUCING APPARATUS

Filed June 17, 1957 8 Sheets-Sheet 6

INVENTOR
Lawrence V. Guest
BY
Ralph B. Stewart
ATTORNEY

Aug. 30, 1960 L. V. GUEST 2,950,921
SOUND REPRODUCING APPARATUS
Filed June 17, 1957 8 Sheets-Sheet 7

INVENTOR
Lawrence V. Guest
BY
Ralph B. Stewart
ATTORNEY

Aug. 30, 1960 L. V. GUEST 2,950,921

SOUND REPRODUCING APPARATUS

Filed June 17, 1957 8 Sheets-Sheet 8

INVENTOR
Lawrence V. Guest
BY
Ralph B. Stewart
ATTORNEY 2,950,921

SOUND REPRODUCING APPARATUS

Lawrence Vincent Guest, Old Hill, England, assignor to Birmingham Sound Reproducers Limited Filed June 17, 1957, Ser. No. 665,911

4 Claims. (Cl. 274—10)

The present invention relates to apparatus for use in the reproduction of sound from a succession of disc records of various and mixed sizes fed singly in succession on to a turntable by downward movement from the lower end of a stack carried on a spindle extending upwards from the centre of the turntable, and to automatically operated apparatus of this kind wherein the extent of the inward swinging movement from an outer position imparted to the reproducer in the general direction parallel to the plane of the turntable, as a preliminary to the lowering of the stylus into engagement with the record to be played, is made to correspond with the size of that record, by mechanism adapted to function as a temporary stop for the inwardly moving reproducer, operation of said mechanism being determined by the engagement or non-engagement of a part thereof by the edge of that record as it moves from the lower end of the stack to the playing position on the turntable.

The invention relates in particular to apparatus of the kind wherein the means determining the extent of the inward movement imparted to the reproducer consists of a fixed support and settable means in the form of a stop or arresting device extending above and below the level of the turntable and mounted for movement into alternative positions relative to the fixed support, the said arresting device being biased for movement in one direction and the position thereof being determined by a movable detent located adjacent the upper end of the arresting device and having a blade adapted to extend into the path of movement of records of above a given size falling from the stack to the playing position and such that the detent is moved by a falling record of above a given size, the lower end of the arresting device being arranged for engagement by a part (hereinafter referred to as "the locator member") movable with the reproducer arm during its swinging movement, so as to arrest the inward movement of said locator member and the reproducer arm at one or other of a number of different points according to the set position of the arresting device, at which point the stylus of the reproducer is poised over the edge of the previously fallen record now in the playing position.

One example of an apparatus of this kind is that described in the specification of my co-pending application No. 609,608, now Patent No. 2,825,570.

In apparatus of this kind as hitherto constructed it has been usual to arranged for the locator member movable with the reproducer arm and engaging the set arresting device to locate the stylus of the reproducer over the edge of the previously fallen record, to be clutched to and unclutched from the reproducer arm unclutching being effected after the stylus has been located, so that the reproducer arm is freed for the swinging tracking movement necessary during reproduction, although the said locator member remains at least temporarily in engagement with the arresting device.

It is an object of the invention to provide an improved form of sound reproducing apparatus of the kind indicated above but wherein the need for a clutch between the locator member and the reproducer arm is eliminated.

In accordance with the present invention sound reproducing apparatus of the kind indicated is provided having pick-up locating means comprising a fixed support, a movable arresting member biased in one direction and movable relative to the fixed support into any one of two or more pre-determined alternative pick-up locating positions, means for determining which of said pre-determined positions is occupied by the arresting member comprising means for sensing the size of a record being transferred into playing position and operating to move said arresting member into the appropriate position, a movable locator member connected for movement in unison with the pick-up arm and adapted to take part in swinging movement thereof in both directions and to make abutting engagement with the arresting member to interrupt swing of said locator member and therefore of the pick-up arm in the inward direction in the position of appropriate location as a preliminary to commencement of reproduction of the record in the playing position, and means for moving the arresting member, after such location of the pick-up, into a further position other than any one of the above mentioned pre-determined alternative pick-up locating positions in which the arresting member is spaced from the locator member.

The means for moving the arresting member into the said further position may be a lever moved by a part of the automatic mechanism of the machine, the said lever engaging and moving the arresting member into the said further position as or after the stylus of the located pick-up moves into contact with the record and maintaining it in that further position throughout the remainder of that cycle of automatic operations and also throughout the succeeding reproduction, and releasing it for a return movement to that one of the said pre-determinated alternative detent-controlled pick-up locating positions corresponding to the smallest size of record to be played, at a point during the succeeding automatic cycle preceding the dropping of the next record to be played.

The invention is illustrated by way of example in the accompanying drawings as applied to a machine capable of reproducing from disc records of three different sizes.

Figure 7:
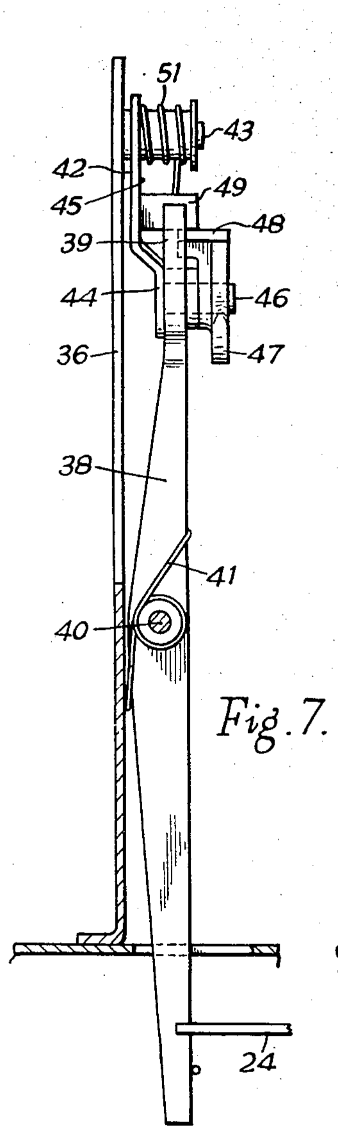
Figure 8:
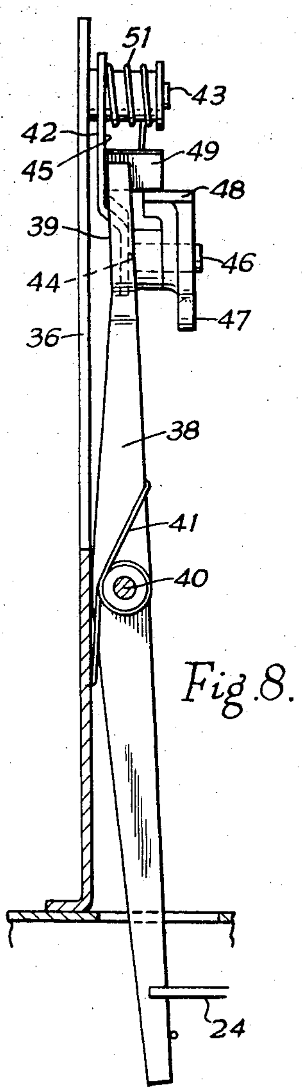
Figure 9:
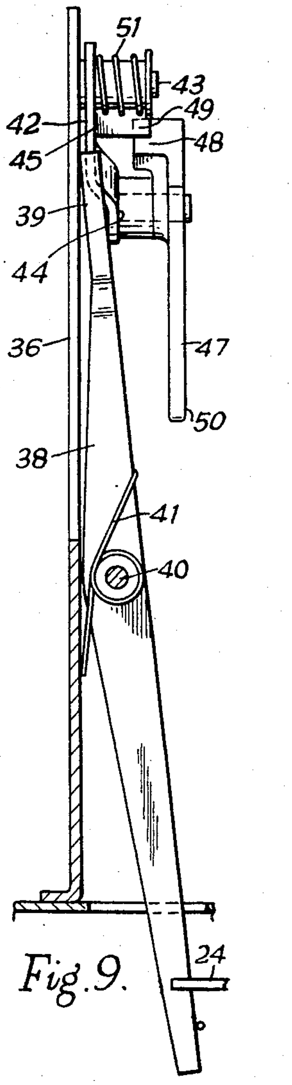
Figures 11, 12, 13, 14, 15, 16:
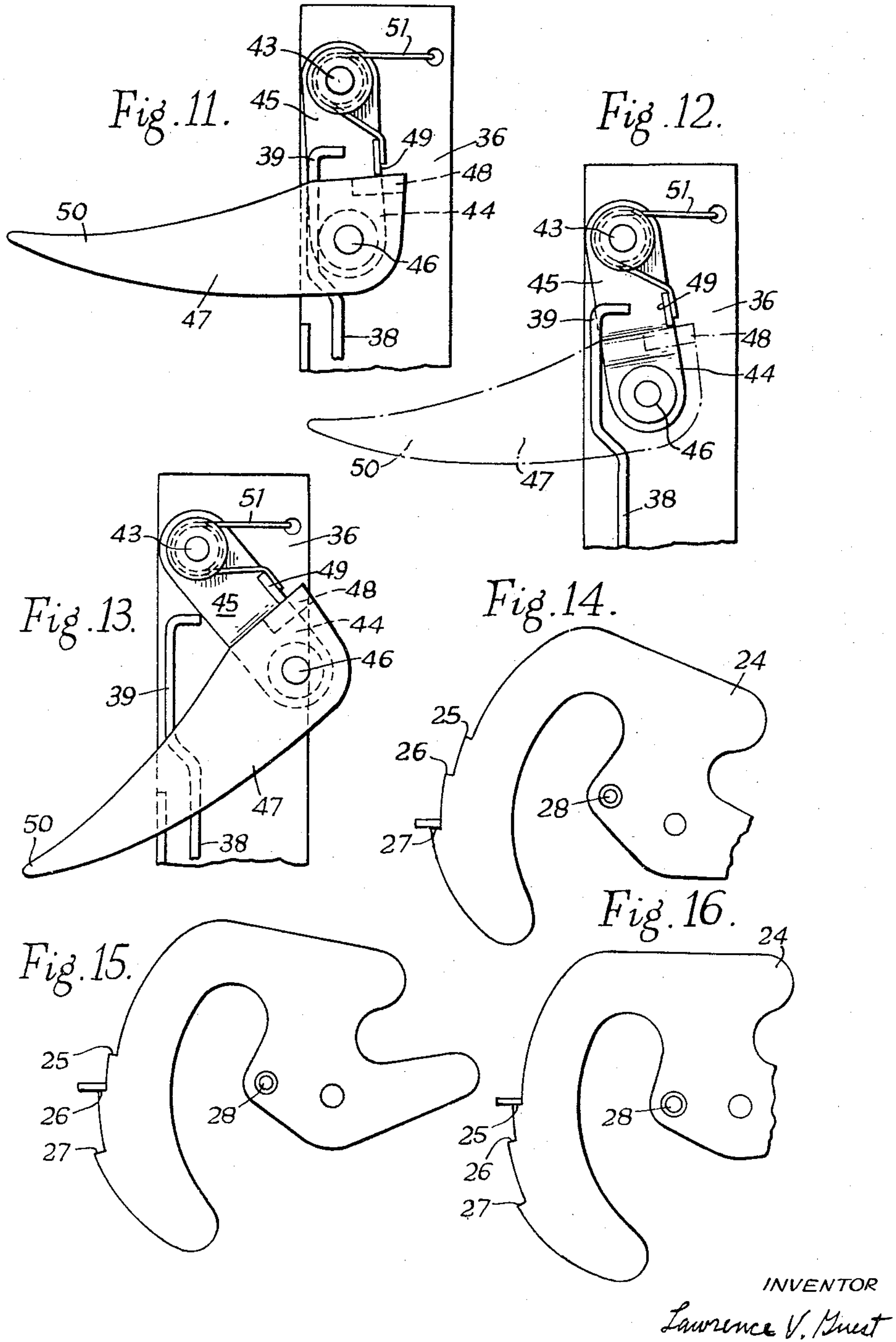

Figs. 11, 12 and 13 are views in front elevation and on a larger scale showing the upper end of the arresting member in the positions corresponding to Figs. 7, 8 and 9 respectively, and Figs. 14, 15, 16 and 17 illustrate diagrammatically several positions taken by the locator member in relation to the arrestor member.

Figure 1:
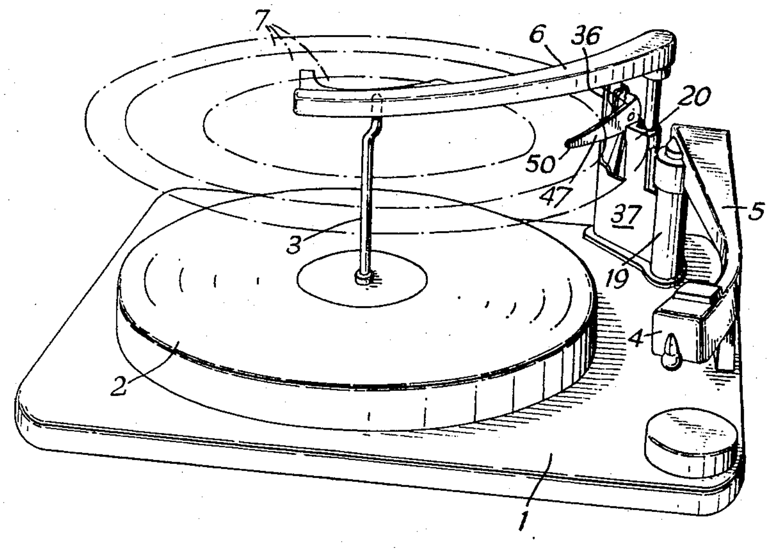
Fig. 1 is a general perspective view of a complete machine.

Referring to the drawings, the machine shown in Fig. 1 is of a generally known kind comprising a motor board 1 supporting a rotatable turntable 2 driven by a motor (not shown), a spindle 3 extending upwards from the centre of the turntable 2 suitable to support a stack of records of three mixed sizes with their centre holes engaged over the spindle 3, a pick-up 4 carried at the free end of a pick-up arm 5 mounted for both transverse and up and down swinging movements in the usual manner and a record-steady arm 6 capable of both up and down and swinging movements about a pivot and normally resting with its free end on the stack of records, indicated diagrammatically at 7 in Fig. 1, on the spindle 3 to maintain said records horizontal.

Machines of this kind include mechanism which on completion of the playing of a record is automatically clutched to a motor driven part of the machine so as to be driven thereby, to carry out a cycle of automatic operations comprising swinging the pick-up arm 5 upwards to disengage the stylus of the pick-up 4 from the played record disc, swinging the raised pick-up arm 5 transversely to a position such as is shown in Fig. 1 outside the edge of a record of any size to be lowered from the stack 7 on to the turntable 2, releasing the lowermost record of the stack 7 to fall from the spindle 3 into the playing position on the turntable or on to the record or records already on the turntable, swinging the pick-up arm 5 inwards to locate the pick-up 4 over the starting edge of the record now to be played and lowering the pick-up arm 5 to engage the stylus of the pick-up 4 with the record now in the playing position.

In the machine illustrated all these movements of the pick-up arm 5 are effected through a plate 8 (Fig. 4) arranged to make to and fro guided movements in a straight line during one revolution of a gear wheel 9 which is clutched automatically, in a manner well known and forming no part of the present invention, to a gear wheel (not shown) on the central boss on the underside of the turntable 2, on the conclusion of playing of a record. The gear wheel 9 carries on its underside a cam 10 (Figs. 4 and 5) co-operating with lugs 11 on the plate 8 to impart a single complete reciprocation to the plate during a single revolution of the gear wheel 9 to effect a complete cycle of automatic operations.

On a bracket 12 on the underside of the motor board 1 is mounted a bell crank lever 13 rockable about a horizontal pivot provided by a slot in the bracket 12 and urged in one direction about the pivot by a spring 14.

Figures 5, 6:
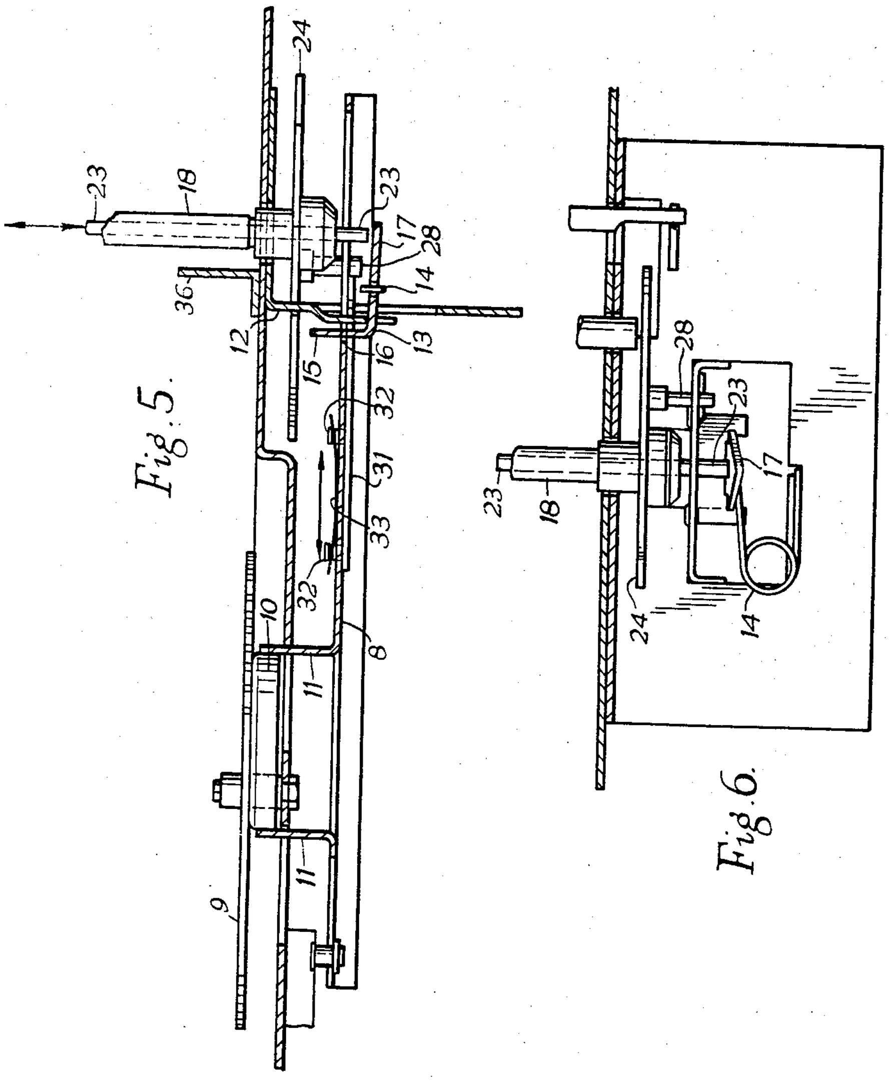
Fig. 5 is a view in sectional side elevation of the parts of the automatic mechanism shown in Fig. 4.
Fig. 6 is an end sectional elevation looking from the right hand end of Fig. 5.
Figure 3:
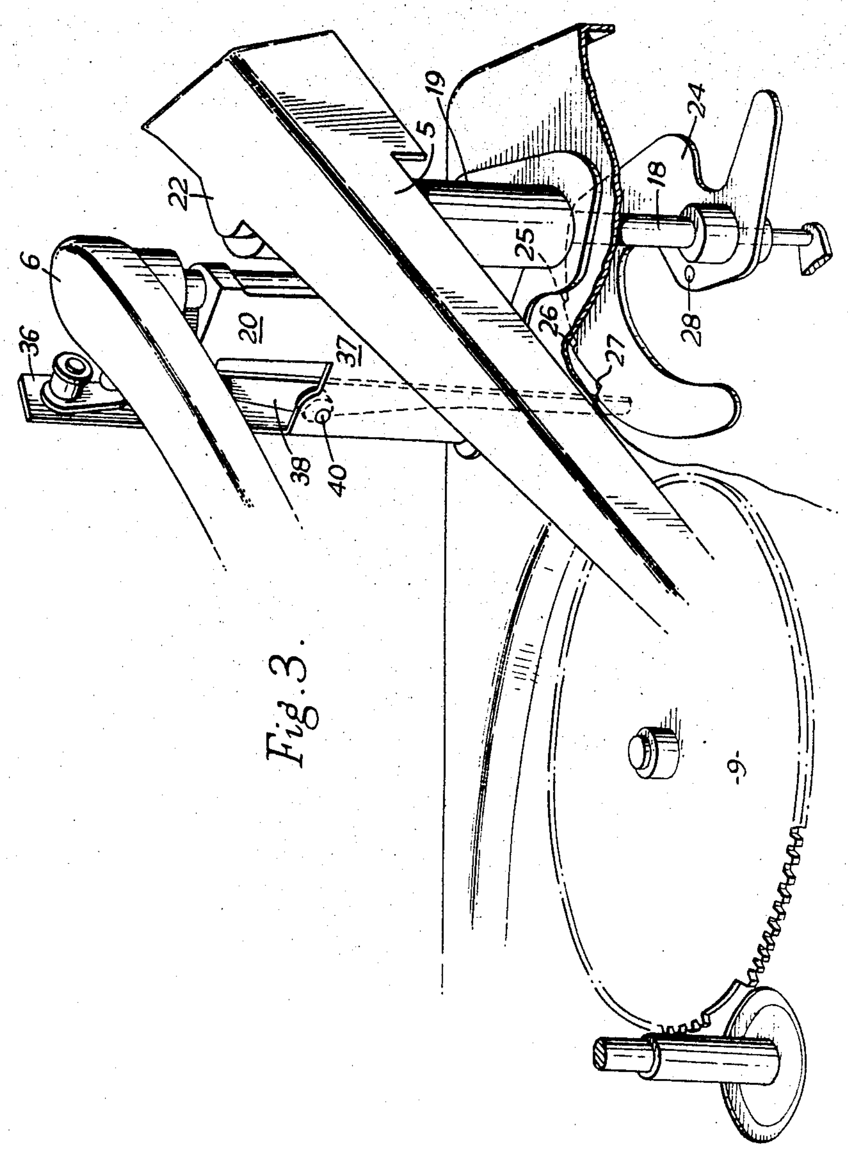
Fig. 3 is a perspective view showing parts of the pick-up locating mechanism in another position.

One arm 15 of the lever 12 extends upwards through a slot in the plate 8 and in the normal or rest position of the plate 8 that is to say, the position occupied whilst a record on the turntable 2 is being played, the said arm 15 is engaged by the end 16 of the slot in the plate 8 so that the other arm 17 of the lever 12 extending in a general horizontal direction is held in a depressed position as shown in Figs. 5 and 6 in opposition to the urge of the spring 14.

The pick-up arm 5 is mounted at the upper end of a hollow vertical spindle 18 extending through the motor board 1 and capable of rotation in a bearing sleeve 19 forming part of a fixed support 20 mounted on the motor board 1, so that the pick-up arm 5 can make the necessary transverse swinging movements about the vertical axis of the hollow spindle 18. The mounting of the pick-up arm 5 on the spindle 18 is effected through a horizontal pivot spindle 21 carried by a block 22 itself fixed to the spindle 18 so that the pick-up arm is also rockable vertically about the pivot spindle 21 to permit the pick-up 4 to be raised and lowered.

A pin 23 extends through and is capable of up and down movement in the hollow spindle 18 and rests with its lower end on the horizontal arm 17 of the bell crank lever 12 and in this position its upper end lies close beneath a point on the pick-up arm 5 in front of the horizontal pivot spindle 21.

When the plate 8 commences to move in the execution of an automatic cycle i.e. to the left from the position shown in Fig. 5, the end 16 of the slot therein moves away from the arm 15 of the bell crank lever 12 so that the lever is permitted to rock under the urge of the spring 14 and its horizontal arm 17 to rise and lift the pin 23, thereby moving the pick-up arm 5 upwards about the pivot 21 to lift the pick-up 4 from the played record.

Upon the return of the plate 8 and near the end of the automatic cycle the end 16 of the slot in the plate 8 reengages the arm 15 of the lever 12 so that the horizontal arm 17 is lowered against the spring 14 to lower the pin 23 and the pick-up is permitted to engage the record on the turntable 2.

Between such raising and lowering movements of the pick-up arm and pick-up, the pick-up arm is swung transversely outwards, a new record delivered from the stack 7 to the playing position and the pick-up arm swung transversely inwards.

Figure 2:
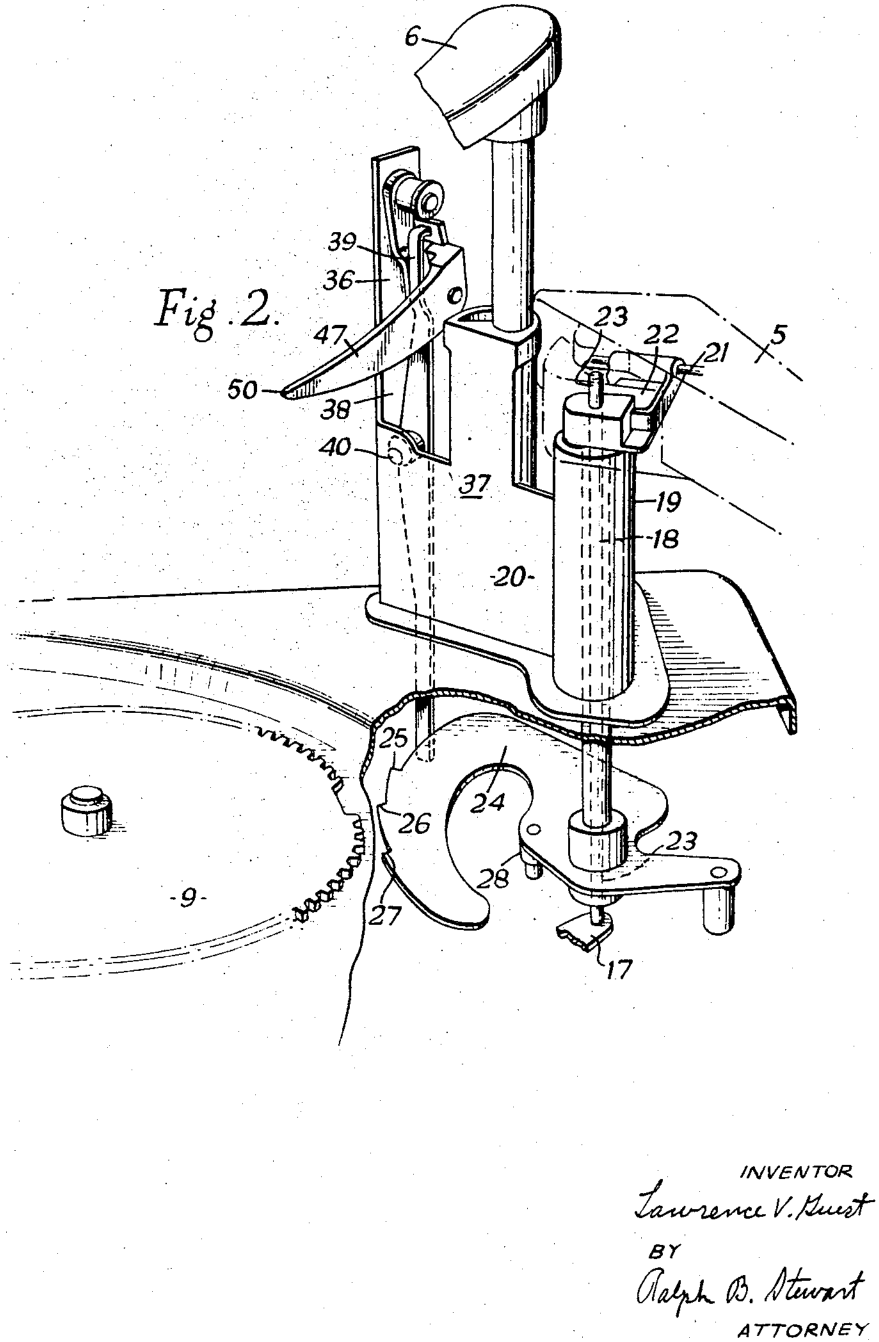
Fig. 2 is a perspective view showing parts of the pick-up locating mechanism in one position.

The means for swinging the pick-up arm transversely is as follows:

On the lower end of the hollow spindle 18 and below the motor board 1 is fixedly mounted a pick-up locator member 24 in the form of a plate having an edge of a general arcuate contour with three stops 25, 26 and 27 at progressively increasing radial distances from the axis of the hollow spindle 18 considered in the counter-clockwise direction in Fig. 2.

The locator member 24 carries a downwardly extending pin 28 projecting through a slot 29 in the reciprocating plate 8. Beneath the plate 8 is also mounted bar 31 capable of sliding longitudinally thereof, the bar being mounted by means of pins 32 extending through a guide slot and a flat spring 33 being located between the heads of the pins 32 and the face of plate 8 to impose frictional restraint on movement of the bar 31 relative to the plate 8.

One end of the bar 31 overlies one end of the slot 29 in the plate 8 and a lateral projection 34 is provided on the bar 31 for engagement with the fixed bracket 12 depending from the motor board 1 at a given point in the reciprocating movement of the plate 8 to cause the bar 31 to take a predetermined normal position relative to the plate 8.

Figure 4:
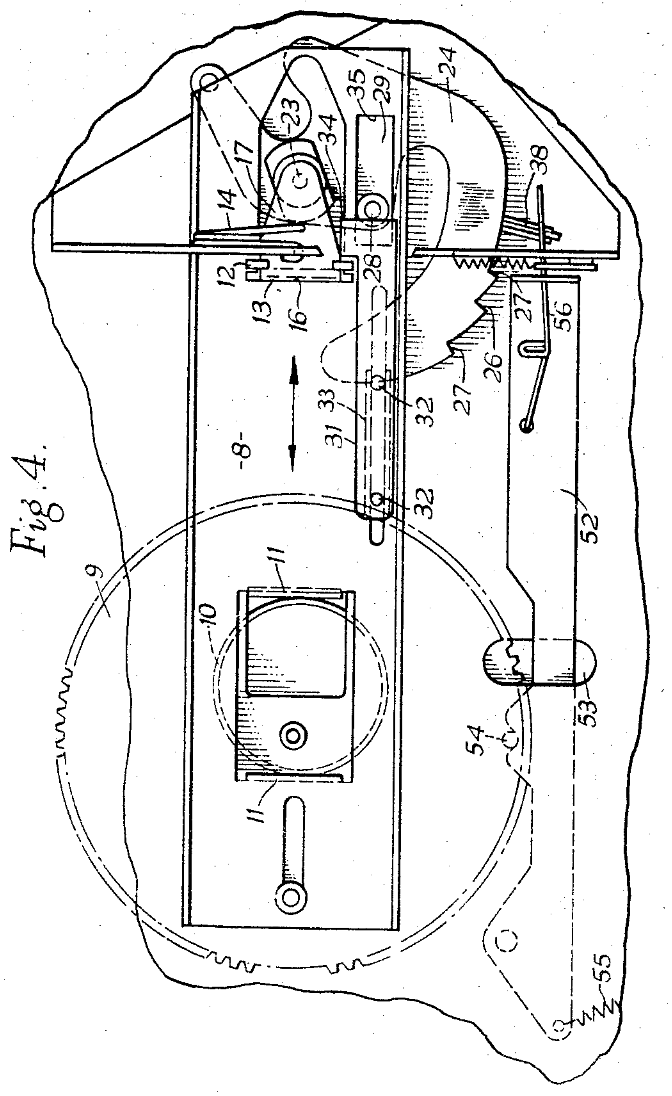
Fig. 4 is an underside plan view of a part of the automatic mechanism.

One end 35 of the slot 29 in the plate 8 makes engagement with the pin 28 on the locator member 24 at a given point in the movement of the plate 8 in its first direction i.e. to the left in Fig. 4 to effect outward swinging movement of the locator member 24 and the pick-up arm 5 affixed thereto into an outermost position such as is shown in Fig. 1. This outward movement is of course subsequent to the raising of the pick-up arm 5 as previously described and the extent of said outward swinging movement is constant, and during the same movement the projection 34 on the bar 31 meets the fixed bracket 12 so that the bar 31 is caused to slide or reset on the plate 8 against the friction of spring 33 to take the above mentioned normal position.

Upon movement of the plate 8 in the return direction i.e. to the right in Fig. 4, the end of the bar 31 meets the pin 28 to cause the locator member 24 and the pick-up arm 5 to swing inwards and such inward swinging movement continues until the locator member 24 and the pick-up arm 5 connected therewith are arrested in a manner yet to be described, whereupon the bar 31 is also brought to a standstill, the movement of plate 8 continuing by virtue of the yielding friction coupling only, provided by the spring 33.

With the pick-up arm 5 swung to its outermost position during the movement of the plate 8 in its first direction, a record is released from the lower end of the stack 7 by any convenient and well known record-release means, which conveniently may be operated by the movement of the reciprocating plate 8, to slide down the spindle 3 into the playing position.

The means for ensuring that the extent of the subsequent inward swing of the pick-up arm 5 is appropriate to enable the pickup to engage with the commencing edge of that size of record which was released from the stack and is now in the playing position is as follows:

The fixed support 20 carried by the motor board includes a vertical flat end post 36 at right angles to the front wall 37 of the support 20.

A bar 38 extending in a general vertical direction and disposed with its upper end 39 above the turntable 2 and with its lower end extending through the motor board 1 and below the level of the turntable 2, is pivoted at a point 40 intermediate its ends to the front wall 37 of the fixed support so as to be capable of limited rocking movements about the pivot 40 in a plane at right angles to the face of the flat post 36. The bar 38 constitutes the above mentioned stop or arrestor member.

A light spring 41 embraces the pivot 40 and abuts the flat post 36 and the bar 38 in such a manner as to urge the upper end 39 of the bar towards the face of the upper end of the flat post 36.

At the upper end of the flat post 36 is mounted a detent member in the form of a plate 42 movable about a fixed pivot 43 and in a plane parallel to and spaced from the face of the flat post 36.

The plate 42 is cranked as shown to provide two parallel and spaced surfaces 44 and 45, and at the lower end of the plate is fixedly mounted a stud 46 of smaller diameter than the width of the plate, said stud 46 forming a pivot for a finger or blade 47 movable in a plane parallel to that of the end plate 36 and having a laterally extending lug 48 arranged to engage the underside of a lug 49 on the edge of the plate 42 in such a manner as to limit the rotation of the blade 47 by gravity in one direction about the axis of the stud 46.

The blade 47 extends away from the vertical flat end post 36 in a direction parallel to the face thereof and with its free end 50 directed towards the record supporting spindle 3 and below the level of a stack of records such as 7 supported on said spindle.

A light spring 51, anchored at one end to the flat post 36 encircles the pivot 43 and engages with the plate 42 in such a manner as to urge the plate 42 and its blade 47 with light pressure in one direction about the pivot 43, clockwise in Figs. 2, 9, 11, 12 and 13.

Three positions about the pivot 40 are available to the bar 38 when functioning as an arresting member for the locator member 24 and the pick-up arm, a first position in which the upper end 39 of the bar 38 rests against the surface 44 of the plate 42 as shown in Figs. 7 and 11 and its lower end is in a position in which it is missed by the first two teeth 25 and 26 of the locator member 24 and is engaged by the third tooth 27 as the pick-up arm 5 is swung inwards (see Fig. 14), a second position in which the upper end 39 of the bar 38 rests against the surface 45 of the plate 42 as shown in Figs. 8 and 12, and its lower end is in a position in which it is missed by the first tooth 25 in the locator member 24 and is engaged by the second tooth 26 as the pick-up arm 5 is swung inwards (see Fig. 15), and a third position in which the upper end 39 of the bar 38 rests against the surface of the fixed end post 36 itself as shown in Figs. 9 and 13 and its lower end is in a position to be engaged by the first tooth 25 of the locator member 24 as the pick-up arm 5 is swung inwards (see Fig. 16).

The normal position of plate 42 constituting the detent member is that corresponding with the above described first position of the bar 38 as shown in Figs. 7 and 11. The size and disposition of the blade 47 is such that if the record fed from the supporting spindle 3 to the playing position during an automatic cycle and whilst the pick-up arm 5 is in its outward swung position, is a record of the smallest size e.g. a 7 inch record no contact will be made between that record and the blade 47 so that the detent plate 42 remains unmoved and the bar 38 remains in the above described first position and the subsequent inward swing of the pick-up will cease when the third tooth 27 on the locator member meets the lower end of the bar 38, see Fig. 14, and the pick-up is poised over the starting edge of the seven inch record now in the playing position.

If the released record is of an intermediate size e.g. a ten inch record, the edge of that record makes contact with the end 50 of the blade 47 and the detent plate 42 is rocked about the pivot 43 and against the spring 51 to a limited extent such that the surface 44 of the plate moves from contact with the upper end 39 of the bar 38 and the bar moves about its pivot 40 under the urge of the spring 41 into the above described second position with its upper end 39 resting against the surface 45 on the plate 42. Return of the detent plate 42 by the spring 51 to the original position is prevented by engagement between the edge of part 44 of the plate 42 and the side surface of the upper end 39 of the bar 38. In these circumstances the subsequent inward swinging movement of the pick-up arm 5 will be terminated when the second tooth 26 on the locating member meets the lower end of the bar 38 (Fig. 15) and the pick-up is poised over the starting edge of the ten inch record now in the playing position.

If the released record is a large e.g. twelve inch, record the blade 47 will be rocked against spring 51 to a greater extent by that record and such that the detent plate 42 is wholly disengaged from the upper end 39 of the bar 38, the said bar moving under the urge of spring 41 to a position in which the upper end 39 rests against the end part 36 as shown in Fig. 8 so that the lower end of the bar 38 occupies a position for engagement by the first tooth 25 on the locating member 24 (see Fig. 16), during the inward swing of the locating member and the pick-up arm 5 and the pick-up is poised over the starting edge of the twelve inch record now in the playing position.

Return of the detent plate 42 by the spring 51 to the original position is prevented by engagement between the edge of part 45 of the plate 42 and the side surface of the upper end 39 of the bar 38.

Upon engagement of one or other of the teeth 25, 26 or 27 on the locator member 24 with the lower end of the set arrestor bar 38 the inward swinging movement of the locator member and the pick-up arm 5 connected therewith ceases, the end 35 of the slot 29 in the reciprocating plate 8 receding from the pin 28 on the locator member 24 and the friction bar 31 being held against follow-up of the plate 8 by engagement of that end of the friction bar 31 nearest the slot 29 in the plate 8, with the pin 28 so that the reciprocating plate 8 slides relative to the bar 31 as is permitted by the frictional coupling of the plate 8 and the bar by the spring 33.

As the plate 8 continues the return movement the end of the slot 16 therein re-engages with the depending arm 15 of the bell crank lever 12 as previously described so that the lever is rocked about its pivot 13 against the spring 14 and the horizontal arm 17 of the lever 12 is depressed and the spindle 23 permitted to move downwards in hollow spindle 18 so that the pick-up arm 5 is lowered about its horizontal pivot 21 and the stylus of the pick-up allowed to engage the surface of the record now to be played.

With the stylus engaged with the record it is necessary to free the pick-up arm 5 from the restraint imposed by the engagement of the tooth 25, 26 or 27 of the locator member 24 with the arrestor member 38 so that the pick-up arm 5 and pick-up 4 are made free to traverse the record for playing.

For this purpose a lever 52 pivoted on the motor board 1 and bent to extend through a slot 53 therein is arranged to be rocked by a cam pin 54 on the underside of the gear wheel 9 against a return spring 55, immediately after the pick-up 4 has been lowered into engagement with the surface of the record in the playing position.

Figure 10:
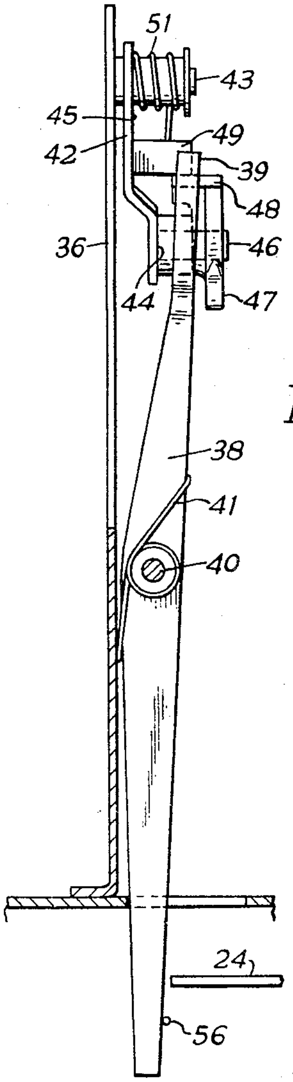
Figs. 7, 8, 9 and 10 are views in side elevation showing various positions of the arresting member.
Figure 17:
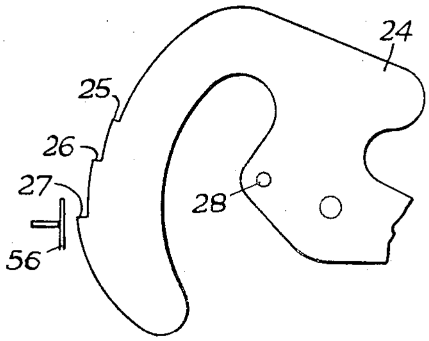

The free end of the lever 52 is extended by a spring bar 56 which makes engagement with the lower end of the arrestor bar 38 (Figs. 4 and 10) at the side thereof adjacent the locator member 24, in such a manner that the bar 38 is moved about its pivot 40 against the light biasing spring 41 into a fourth position as shown in Figs. 10 and 17 in which the lower end of the bar 38 is located outside the path of all of the stops 25, 26 and 27 on the locator member 24 about the axis of the spindle 18 constituting the vertical pick-up pivot.

In this fourth position of the bar 38 its upper end is away from the plane of movement of the plate portions 42 of the detent and the detent is made free to return to its initial position as shown in Fig. 11.

The lever 52 is retained by the cam pin 54 in the position to maintain the bar 38 in the above described fourth position throughout the playing of the record. On commencement of the next succeeding automatic cycle the lever is released by the cam pin 54 at an early stage to make a return movement under the urge of the return spring 55 so that bar 38 is freed to move under the urge of its spring into the described first of its three operative positions in which its upper end 39 is in contact with the surface 44 of the detent plate 42.

The lever 52 may be notched as shown for the reception of the cam pin 54 so that the spring-loaded lever 52 serves to latch the gear wheel 9 accurately in its inoperative position between automatic cycles of operation.

I claim:

1. In a sound reproducing apparatus of the kind for playing automatically a succession of disc records of mixed sizes fed singly from the lower end of a stack to the playing position, said apparatus including a swingable pick-up arm, and an automatic re-cycling mechanism, in combination locating means for the pick-up arm comprising a fixed support, a movable arresting member movable relative to the fixed support into any one of at least two alternative pre-determined operative pick-up locating positions and one-predetermined inoperative position, means for determining which of said pre-determined operative pick-up locating positions is occupied by said arresting member comprising means for sensing the size of a record being transferred into playing position and operating to move said arresting member into the appropriate position, a locator member connected for swinging movement in unison with the pick-up arm and making abutting engagement with the arresting member during inward swinging movement of the pick-up arm to stop the inward swing of said locator member and thereby locating the pick-up arm in the appropriate location preliminary to commencement of reproduction of the record in the playing position, and means for moving the said arresting member after such appropriate location of the pickup arm to said pre-determined inoperative position spaced from said locating member.

2. In sound reproducing apparatus as claimed in claim 1 and including means for returning said arresting member to one of said alternative pre-determined operative positions before another disc record moves to a playing position.

3. In sound reproducing apparatus as claimed in claim 1, including a reciprocable member adapted to make one to and fro movement of fixed amplitude during a cycle of automatic operations and to impart outward swinging movements of fixed extent to the locator member and the pick-up arm during movement of said reciprocable member in a first direction, and a coupling member frictionally coupled with said reciprocable member adapted to impart inward swinging movements of variable extent to the locator member and the pick-up arm during movements of said reciprocable member in the return direction.

4. In sound reproducing apparatus as claimed in claim 1, wherein the arresting member comprises a bar pivoted intermediate its ends on said fixed support for movement in a vertical plane into said alternative pre-determined operative pick-up locating positions and said pre-determined inoperative position and including means for biasing said bar for movement about its pivot in a direction away from the inoperative position and towards the operative positions, a detent plate pivoted on said fixed support and movable in a plane at right angles to the plane of movement of said bar, and a member controlled by the automatic re-cycling mechanism to engage the lower end of said bar and moving it about its pivot into said inoperative position in which it is disengaged from said detent plate and retaining said bar in its inoperative position during the playing interval of the operating cycle.

References Cited in the file of this patent

UNITED STATES PATENTS

| | | |
|---|---|---|
| 2,643,129 | Habegger | June 23, 1953 |

FOREIGN PATENTS

| | | |
|---|---|---|
| 693,594 | Great Britain | July 1, 1953 |